MINIATURE PHONOGRAPH

Filed Jan. 12, 1962 5 Sheets-Sheet 1

INVENTORS
NICHOLAS D. VUYOSEVICH
FREDERICK J. KENT
BY Edward V. Cremins
ATTORNEY June 1, 1965 N. D. VUYOSEVICH ETAL 3,186,717

MINIATURE PHONOGRAPH

Filed Jan. 12, 1962 5 Sheets-Sheet 2

INVENTORS
NICHOLAS D. VUYOSEVICH
FREDERICK J. KENT
BY Edward V. Conness
ATTORNEY June 1, 1965 N. D. VUYOSEVICH ETAL 3,186,717

MINIATURE PHONOGRAPH

Filed Jan. 12, 1962 5 Sheets-Sheet 3

INVENTORS
NICHOLAS D. VUYOSEVICH
FREDERICK J. KENT
BY
ATTORNEY

MINIATURE PHONOGRAPH

Filed Jan. 12, 1962 5 Sheets-Sheet 4

INVENTORS
NICHOLAS D. VUYOSEVICH
FREDERICK J. KENT
BY Edward V. Connors
ATTORNEY

MINIATURE PHONOGRAPH

Filed Jan. 12, 1962 5 Sheets-Sheet 5

INVENTORS
NICHOLAS D. VUYOSEVICH
FREDERICK J. KENT
BY Edward V. [signature]
ATTORNEY United States Patent Office 3,186,717

Patented June 1, 1965

3,186,717

MINIATURE PHONOGRAPH

Nicholas D. Vuyosevich, Fairhaven, and Frederick J. Kent, Glen Rock, N.J., assignors to Nicholas D. Vuyosevich, trading as V-Associates, Matawan Township, Monroe County, N.J.

Filed Jan. 12, 1962, Ser. No. 165,872

10 Claims. (Cl. 274—1)

The present invention relates to phonographs, and particularly to a miniature phonograph such as may be used in a doll, or for other applications in which a low cost, rugged, small phonograph is required.

Prior attempts to produce a small phonograph for such purposes have failed to achieve commercial success because the sound has not been of good quality and the mechanism has been expensive to manufacture, or if of low cost construction, has required almost constant repair.

In accordance with the invention, a miniature phonograph is provided which utilizes cylindrical records small in size and able to withstand rough handling. The records may be changed easily even by small children. The phonograph is illustrated as being spring wound but the construction may be modified for battery powered operation.

Another object of the invention is to provide a miniature phonograph for use in a doll body in which the record is readily interchangeable without disturbing any functional part of the device.

Another object of the invention is to provide a spring wound miniature phonograph in which the operation is set ready for operation solely by winding the spring motor.

Another object of the invention is to provide a miniature phonograph which is simple and economical in manufacture, efficient in operation, and rugged in use.

Other objects and advantages of the invention will be apparent from the following description, and from the accompanying drawings which show, by way of example, an embodiment of the invention.

In the drawings:

FIGURE 19 is a plan view of the stylus arm assembly.

Figure 1:
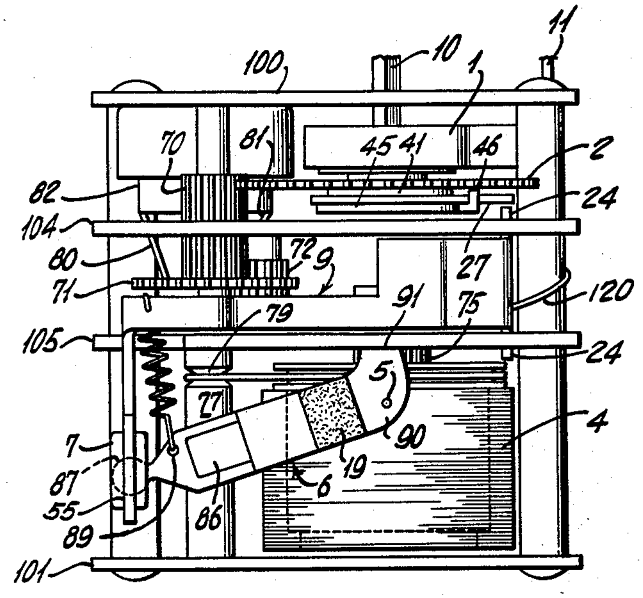
FIGURE 1 is an elevational view of a miniature phonograph in accordance with the invention but with the speaker unit removed, the speaker unit end directed towards the viewer.
Figure 2:
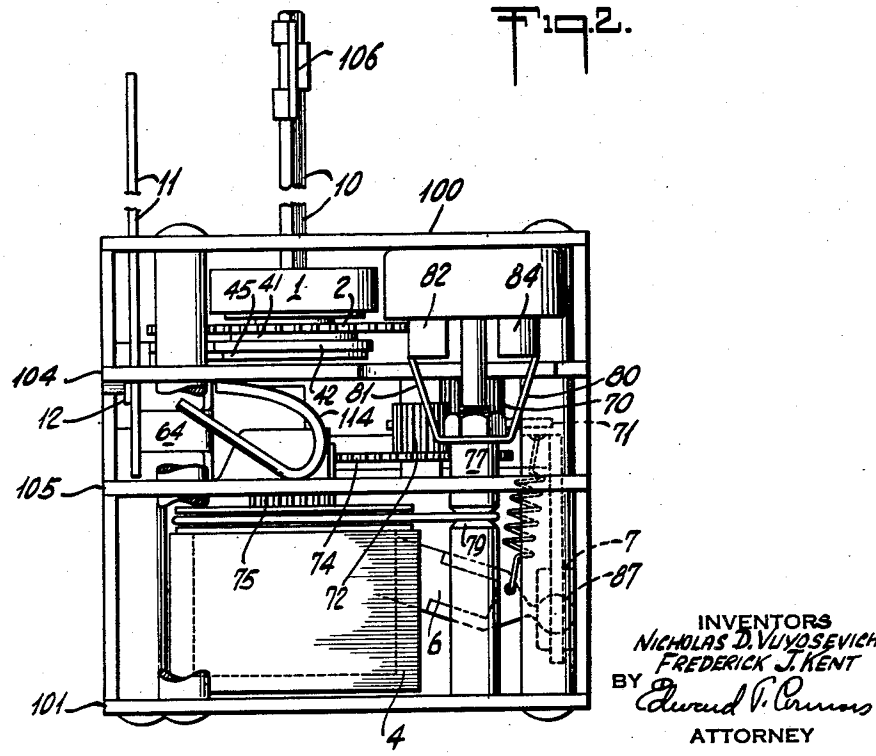
FIGURE 2 is a view corresponding to FIGURE 1 but with the speaker unit in place and the phonograph turned so that the speaker unit faces away from the viewer.

Referring to the drawings there is shown in FIGURE 1 a miniature phonograph in accordance with the invention and including a main spring 1 adapted to turn a main gear 2 to rotate a record 4. A stylus 5 is carried by a stylus arm 6 to track the groove of the record 4. The stylus arm 6 is supported by a ball joint 7 at the end of a lifter member 9. The main spring 1 is adapted to be wound by rotation of winding shaft 10 and a playback is achieved by movement of operating lever 11.

Figure 4:
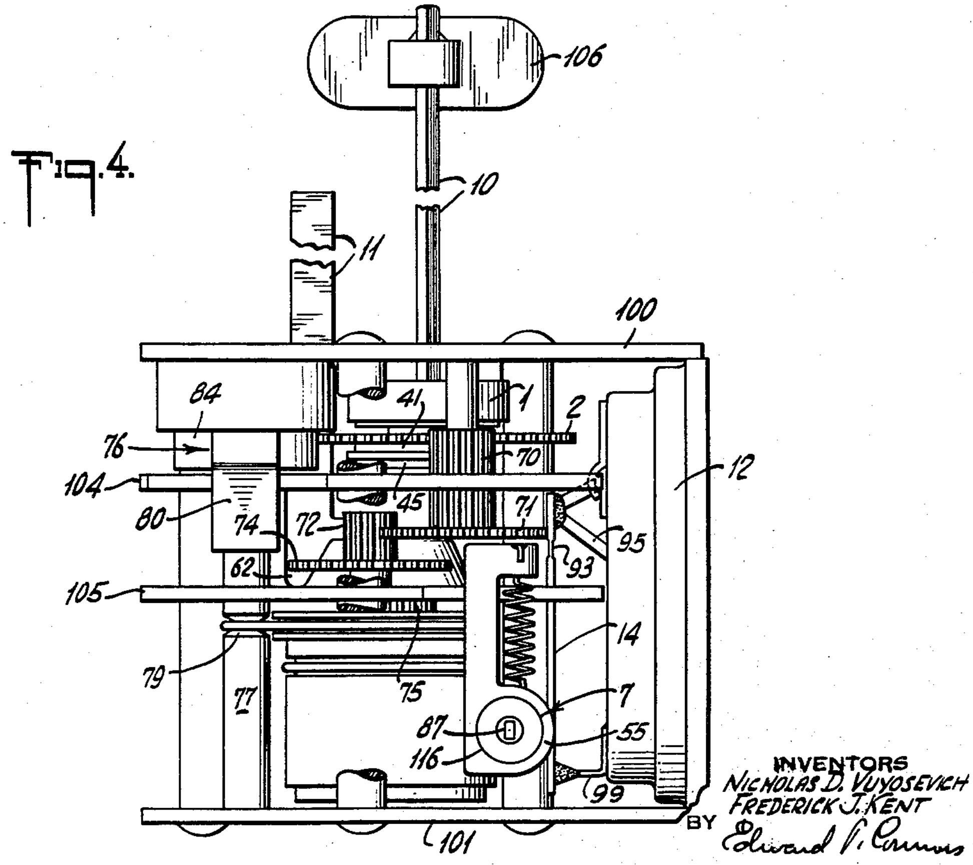
FIGURE 4 is a view corresponding to FIGURE 2 but with the speaker unit turned so that it faces towards the right.

Referring to FIGURES 1 and 4, a speaker 12 has a sound conveying member 14 in sound transmitting relationship between the stylus arm 6 and the diaphragm 15 of the speaker 12. The stylus arm 6 is in slideable contact with the sound conveying member 14 as the stylus 5 tracks the record 4.

Figure 6:
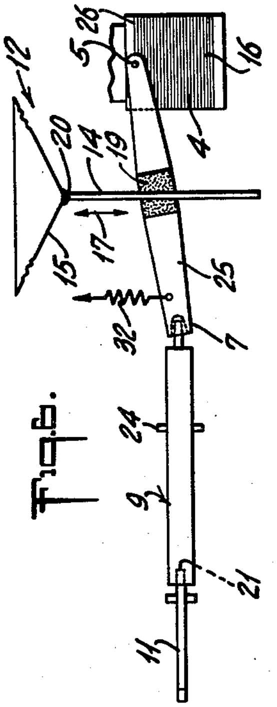
FIGURES 5 and 6 are respectively elevational and plan views schematically illustrating the stylus arm actuating mechanism in accordance with the invention and illustrating the position of the parts just prior to the start of a playback of the record.
Figure 8:
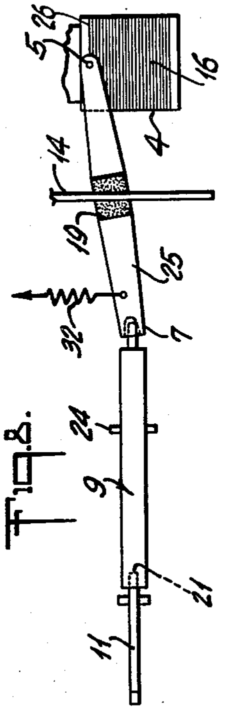
FIGURES 7 and 8 are views corresponding to FIGURES 5 and 6 after the playback operation has been started.
Figure 10:
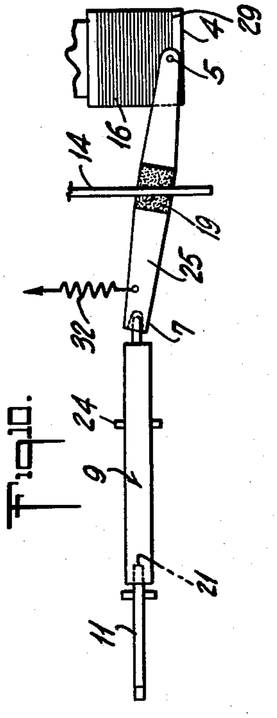
FIGURES 9 and 10 are corresponding views of FIGURES 5 and 6 just prior to the end of a playback operation.
Figure 5:
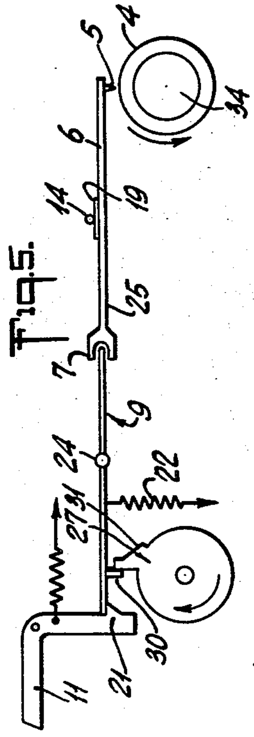
Figure 7:
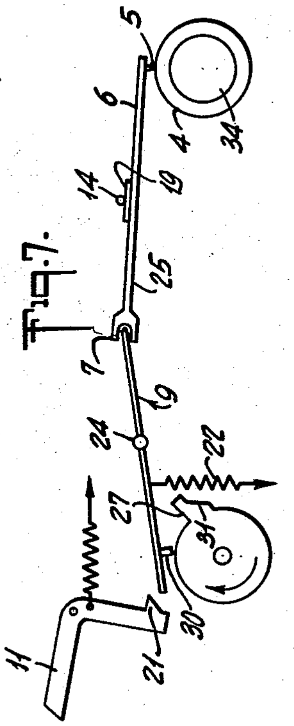
Figure 9:
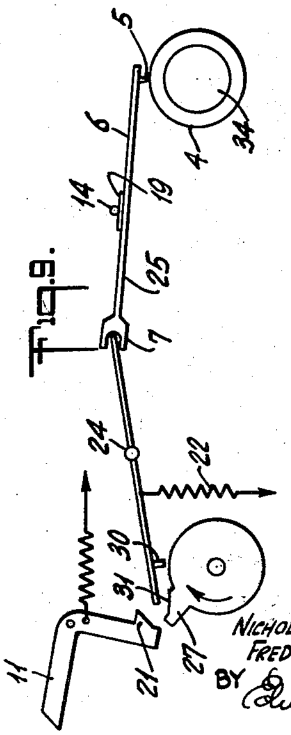

It is believed that the construction in accordance with the invention will be more readily understood by referring to the schematic drawings of FIGURES 5–10. In the sound system in accordance with the invention the stylus 5 is vibrated by laterally cut groove 16 of the record 4 which tends to cause the stylus arm 6 to vibrate in the direction of the arrows 17. By means of a friction pad 19 the vibrations are carried through the sound conveying member 14 to apex 20 of the diaphragm 15. The various steps wherein the stylus 5 is placed in and removed from the groove 16 of the record 4 are shown in FIGURES 5–10. In FIGURES 5 and 6 the parts are shown in a position ready to start an operation. In FIGURES 7 and 8 the parts are shown in a position shortly after a playback has been started. In FIGURES 9 and 10 the parts are shown in a position shortly before the end of a playback operation, and just before the parts are returned to the position shown in FIGURES 5 and 6. Upon the release of latch 21 a spring 22 tends to rotate the lifter member 9 about a pivot 24 to lift the ball joint 7 carrying outer end 25 of the stylus arm 6. The stylus arm 6 is fulcrumed over the sound conveying fulcrum member 14 to urge the stylus 5 into the groove of the record at its starting end 26. The playback of the record continues and cam member 27 is rotated one complete revolution during the playback time of the record 4.

As the stylus 5 reaches end 29 of the record 4 the cam member 27 is approaching a combination lifting and hold member 30 on the outer end of the lifter member 9. Lifting surface 31 of the cam member 27 raises the outer end of the lifter member 9 swinging it about its pivot 24 to lower end ball joint 7 and thereby release the pressure of the stylus 5 against the record 4. Spring 32 pulls the stylus arm 6 from the end 29 of the record 4 to the starting end 26.

During the playback operation the sound has been transmitted from the stylus arm 5 through the friction means 19 and the sound conveying member 14 to the diaphragm 15 of the speaker 12. As the stylus 5 has tracked the groove 16 the friction member 19 has slid along the sound conveying member 14 in the direction away from the apex 20 of the diaphragm 15. At the end of the playing period for the record 4, inasmuch as the pressure of the stylus 5 against the record 4 has been released, the pressure of the friction member 19 against the sound conveying member 14 has been reduced thus the stylus arm 6 is retracted from the end of the record to the starting position without appreciable sound being emitted by the speaker 12.

The record 4 may be easily slipped into position on its record drum 34 (upwardly on FIGURES 1–4) as the record drum 34 is supported at one end only for ease in inserting and removing the record 4. As the stylus 5 is raised from the groove 16 of the record 4 at the starting position, the record 4 may be readily removed without disturbing the stylus arm 6 or the stylus 5. Because of the releasable frictional contact between the friction member 19 and the sound conveying member 14 the stylus 5 is automatically returned to its starting position by its spring 32.

The starting lever 11, through linkage, maintains the stylus 5 removed from the record during the winding operation, and as will appear hereinafter, a brake is applied against the record drum 34 to prevent rotation thereof until the operating lever 11 is actuated.

The record 4 is rotated by the main spring 1 through a mechanism which causes the main spring to be operated at its most efficient condition towards the full wind point. In order to accomplish this condition, means are provided preventing further rewind and operative just before the main spring is completely wound thereby preventing overwinding of the main spring 1. Means are also provided preventing the run down of the main spring 1 at the end of the playback period for the record 4. This mechanism also in part functions to lift the stylus arm 6 so that it is returned to its starting position by its spring 32.

Figures 11, 12, 13, 14, 15, 16:
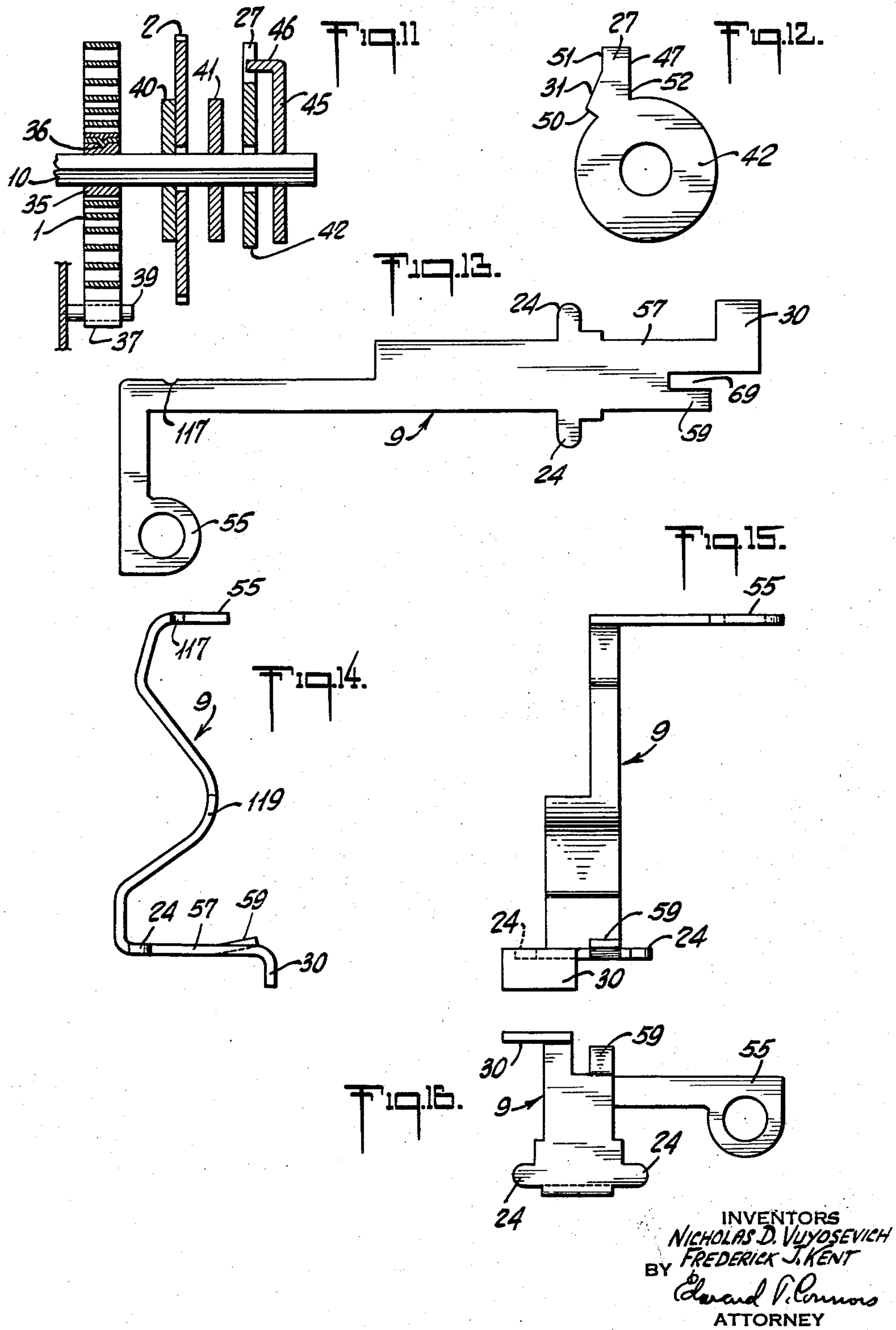
FIGURE 11 is a sectional view of the parts of the winding motor, the parts being shown spaced.
FIGURE 12 is a side view of a cam disc incorporated in the winding motor.
FIGURE 13 is a plan view of a blank forming the lifter member, the view showing the member before it is formed into the desired shape.
FIGURE 14 is an elevational view of the lifter member shown in FIGURE 13 after it has been formed into the desired shape.
FIGURE 15 is a plan view corresponding to FIGURE 14.
FIGURE 16 is an end view corresponding to FIGURE 15.

The winding mechanism or motor is shown in sectional view in FIGURE 11, some of the parts being shown spaced for clarity of illustration. The winding shaft 10 carries an anchormember 35 to which is attached the inner end of main spring 1 by suitable attachment means well known in the art and indicated by the numeral 36. The outer end of the main spring 1 is secured to a holding strap 37 hooked over a spacer stud 39. Interposed between the main driving gear 2 and the winding stem 10 is a suitable ratchet and pawl means 40.

The main spring 1 is wound by rotating the shaft 10, the main driving gear 2 being held from rotation by a brake on the record drum 34 and thus the ratchet and pawl mechanism 40 slips in its engagement with the main gear 2 thereby permitting the winding of the main spring 1.

Outwardly of the main driving gear 2 is a spacer member 41 and a freely mounted cam disc 42 carrying the cam 27. Outwardly of the cam disc 42 is a detent disc 45 attached to the shaft 10 for rotation therewith and carrying a detent 46.

The cam disc 42 is shown in side view in FIGURE 11 and it will be noted that the cam 27 has on one side thereof a flat stop and detent engaging surface 47 while on the other side or face thereof is the lifting surface 31 and a detent engaging surface 50. If desired, the outer end of the lifting surface 49 may be provided with a straight stop member engaging surface 51, although in some constructions the surface 51 may be omitted. The radius of the detent 46 is such that it contacts inner portion 52 of the stop surface 47 in one direction of rotation and the detent engaging surface 50 upon the opposite direction of rotation.

The lifter member 9 is formed from a blank as shown in FIGURE 13 and is thereafter shaped as illustrated in FIGURES 14–16. Referring to FIGURE 13 the lifter member 9 has at its outer end supporting means 55 for the ball joint 7. Pivot 24 is provided by means of ears extending outwardly from the main body of the member. Inner end 57 of the lifter member 9 is bifurcated thereby forming a hold arm 59 and the combination stop and lifting arm 30.

Figure 17:
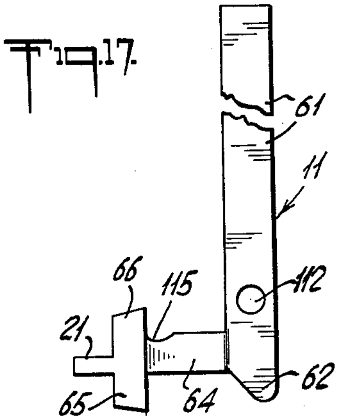
FIGURE 17 is a side view of the starting lever.
Figure 18:
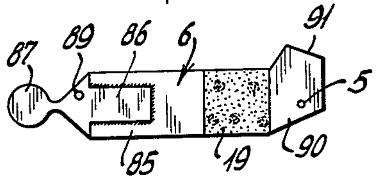
FIGURE 18 is an end view of the starting lever shown in FIGURE 17.

The starting lever 11 is shown in FIGURES 17 and 18 and is adapted to be held in position in slots in the frame of the phonograph. Its operating end 61 may be of any desired length and it is adapted to pivot on its end 62. Its arm 64 has an extension forming a brake member 65, and opposite the brake 65 is a stop extension 66. The latch 24 projects outwardly between the brake 65 and the stop 66, the latch 21 being of a width to pass through slot 69 of the lifter member 9.

In order to rotate the record drum 34, suitable gearing is provided (FIGURES 2 and 4) driven by the main driving gear 2 and including a pinion 70 fixed on a shaft with a gear 71 to drive a pinion 72 fixed on a shaft with a gear 74, which, in turn, is engaged with a pinion 75 carried by the drum 34.

In order to assure a steady rate of rotation of the record drum 34 a governor 76 is provided including a shaft 77 having a groove forming a pulley sheave 79. Attached to the shaft 77 is a pair of spring arms 80 and 81 respectively carrying at their outer ends brake weights 82.

Figure 20:
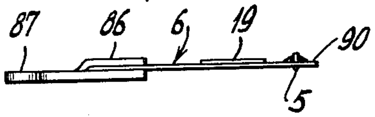
FIGURE 20 is a side view of the stylus arm assembly shown in FIGURE 19.
Figure 18:
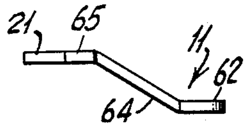

The stylus lifting arm 6 in the commercial embodiment is illustrated in FIGURES 19–20 and is made preferably from hard drawn aluminum sheeting about .005 inch in thickness, and about ¼ inch in width, which is a sufficient width to prevent rocking of the arm when the friction pad 19 is in contact with the sound conveying member 14. At one end 85 is a supporting member 86 having a generally ball shaped end 87 to which is attached the end 85 of the stylus arm 6 by cement or by other suitable attachment means. An aperture 89 is made to receive one end of the spring 32. The stylus arm 6, at its stylus holding end 90, is apertured to receive the stylus 5 which may be secured in position in any suitable manner as by the use of cement. The stylus holding end 90 is provided with a flat stop surface 91 used to define the innermost position of the stylus arm 6 at the starting end 26 of the record.

The friction means 19 may be cemented in position and is preferably a pad or section of a sheet of small grain cork from .10–.030 inch, and preferably from .015 to .020 inch, in thickness and about ¼ inch square. It has been found that an excessive thickness in the cork results in less volume in the sound as the cork absorbs the vibration, while an insufficient thickness also results in less volume as the cork surface does not tend to make proper frictional grip with the sound conveying member 14.

Figure 21:
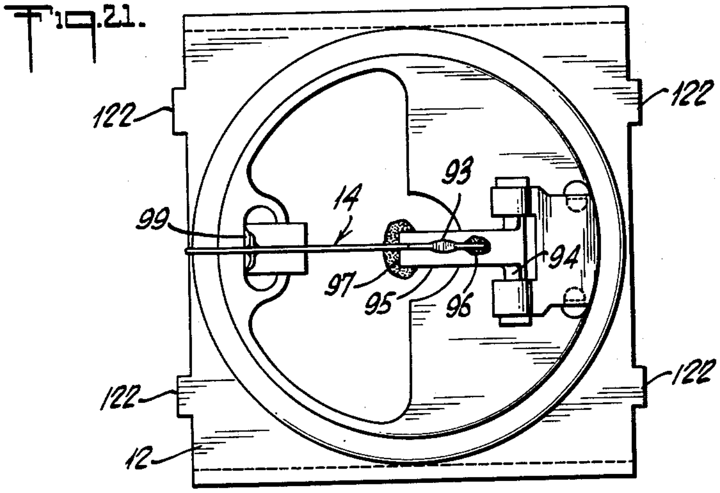
FIGURE 21 is an end view of the speaker assembly facing the apex of the speaker.
Figure 22:
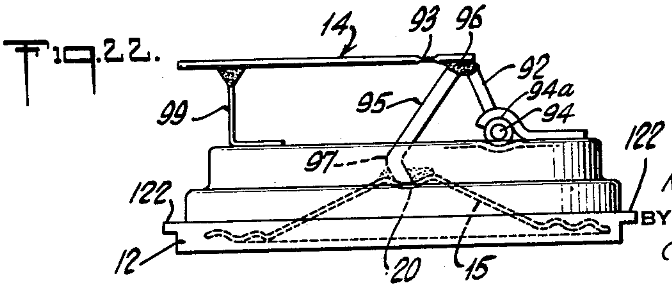
FIGURE 22 is a side view of the speaker assembly shown in FIGURE 21.

The assembly of the speaker 12 with the sound conveying member 14 is shown in FIGURES 21–22. The sound conveying member 14 in the commercial embodiment includes a supporting end member 92 pivoted at one end 94 and carried by a sound insulating brushing **94*a* which may be made of rubber. An arm 95 extends from outer end 96 of the supporting end member 92. Outer end 97 of the arm 95 is fixedly attached to apex 20 of the diaphragm by cement or by other suitable means. The sound conveying member 14 is supported at its other end by a swingable support 99 preferably made of spring Phosphor bronze about .006 inch in thickness and having a maximum width at its base of about ¼ inch, and may be about $1\frac{1}{32}$ inch in length, tapering at its outer end to a somewhat greater width than the diameter of the sound conveying member 14. The tapered end may be formed with a recess to receive the sound conveying member 14 and cement or other suitable means such as welding may be used to hold the sound conveying member 14 to the tapered end of the supporting member 99. The sound conveying member 14 is preferably made of stainless steel spring wire and may be about 1¼ inches in length with a diameter of about .03 inch and is attached to end 96 of the member 92 by cementing, welding, or other suitable means. Adjacent its attachment to the end 96, the member 14 is swaged as indicated at 93** to a thickness of about .003 inch to provide added flexibility thereto and to permit the pivoted supporting member 92 to swing about its pivot 94.

The various parts of the miniature phonograph are assembled as shown in FIGURES 1 through 4 between a frame including a first plate 100 and a second plate 101 separated by the spacer members 39. Intermediate plates 104 and 105 are also supported by the spacer members 39 between the plates 101 and 39. The winding shaft 11 may have a winding key 106 at its outer end, its inner end being journaled in the plates 100 and 104. The winding motor assemblage shown in FIGURE 11 is positioned on the winding stem 10 between the plates 100 and 104. The pinion 70 and its gear 71 are journaled between the plates 100 and 105, plate 104 being apertured so that pinion 70 may extend therethrough. Pinion 70 and gear 74 are journaled between plates 104 and 105. The record drum 34 is journaled in a recessed portion of plate 105 the recess being in the direction of plate 104 so that the pinion 75 may be driven by the gear 74. The governor shaft 77 is journaled between the plates 100 and 101, plate 105 being apertured to receive the shaft 77. The pulley sheave in the shaft 77 is in alignment with a groove 110 made in the record drum 34 to receive a belt 111.

The starting lever 11 extends through slots in the plates 100 and 104, its lower end 62 pivoting on the plate 105. A protuberance 112 is made extending from the side of the starting lever 11 and adapted to contact the plate 104 on the underside thereof so as to hold the starting lever 11 in position. A spring 114 (FIGURE 2) is abutted between a recess 115 (FIGURE 17) on extension 64 of the starting member 11 and the underside of plate 104 (FIGURE 2) to normally urge the starting lever 11 in the position so that its brake member 65 contacts the end of the record drum 34.

The lifter member 9 has its pivot supporting means 24 journaled between plates 104 and 105. The ball joint 7 includes the ball joint supporting means 55 fitted with a sound insulating grummet 116 to receive the ball supporting end 87 of the stylus member 6. The spring 32 tending to pull the stylus arm 6 to the starting end 26 of the record 4 has one end attached to the opening 89 in the stylus arm end 87, while the other end of the spring 32 is hooked around or otherwise suitably secured to the lifter member 9 in a depression 117 therein adjacent the ball joint supporting means 55. The ball joint 7 in assembly may be viewed in FIGURE 4 under the pinion 70.

Figure 3:
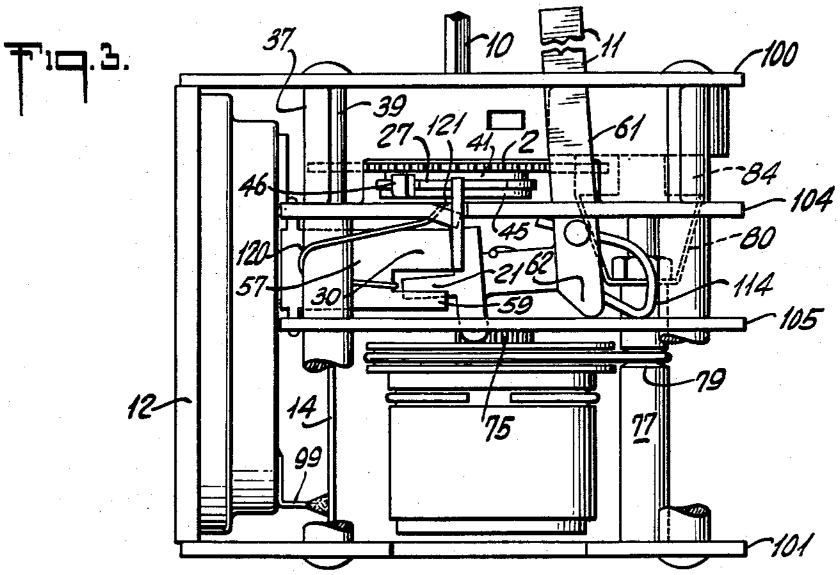
FIGURE 3 is a view corresponding to FIGURE 2 but with the speaker unit turned so that it faces towards the left.

The lifter member 9 is bent in inwardly as indicated at 119 (FIGURE 14) so as to provide clearance with the sound conveying member 14. The lifter member 9 extends from left to right across FIGURE 1 with its pivot supporting means 24 journaled between plates 104 and 105 to the left of the right hand spacer 39. The inner end 57 of the lifter member 9 is shown in the assembly of FIGURE 3. In order to urge the lifter member 9 into the position so that its end 57 will swing inwardly, or away from the viewer as viewed in FIGURE 3, a spring 120 is provided having one end extending into an opening 121 provided in the plate 104, the other end of the spring 120 being received in the slot 69 of end 57 of the lifting member 9. It will be observed from FIGURE 3 that the combination stop and lifting arm 30 at the end 57 of the lifting member 9 extends through the opening 121 into the space between the plates 104 and 100 so as to be contacted by the cam 27.

The speaker assembly shown in FIGURES 21–22 is interposed between the plates 100 and 101, the speaker assembly having protuberances 122 adapted to be received in cooperating slots in the plates 100 and 101.

Upon the assembly of the parts, the winding stem 10 is turned so that the spring is wound to the desired tension. The combination stop and lifting arm 30 is moved outwardly or towards the viewer in FIGURE 3 so that it permits the passage of the cam member 44 thereby. In the final assembly of the phonograph and after the desired tension is provided on the main spring, the downwardly turned end of plate 104 is turned back into the plane of the plate thereby preventing outward movement of the member 30. Further winding of the main spring is prevented by contact of the stop surface 47 of the cam 44 and the arm 30.

In the operation of the phonograph, a record 4 is placed in position on the record drum 34 and, if it has not already been wound, the main spring 1 is wound by rotating the winding key 106. In order to start a playback operation the starting lever 11 as viewed in FIGURE 3 has its top end swung towards the right. This raises the latch 21 upwardly away from engagement with the hold arm 59 of the lifting member 9 and the latch 21 passes through the slot 69 thereby permitting the end 57 of the lifting arm 9 to be moved inwardly under the action of the spring 120.

Simultaneously as the ball joint 7 and the lifting arm 9 is urged outwardly or towards the right as viewed in FIGURE 4, the outward movement of the ball joint 7 swings the stylus arm 6 outwardly so that the cork friction pad 19 fulcrums on the sound conveying member 14 thereby urging the stylus 5 into the groove 16 of the record 4. Continued rotation of the record 4 causes lateral vibrations to be set up in the stylus arm 6, these vibrations being transmitted through the friction means 19 into an axial movement of the sound conveying member 14 which axial movement is transmitted through the arm 95 into an inward and outward movement of the apex of the speaker 20. It should be noted that the supporting means for the sound conveying member 14 including the swingable support 99 and the pivoted supporting member 92, through the flexibility provided by the swaged portion 93, readily transform the axial movement of the member 14 into an axial movement of the apex 20 of the speaker diaphragm 15.

During the rotation of the main driving wheel 2 in rotating the record 4, the detent 46 has been swung by the winding shaft 10 so that it approaches and ultimately contacts the stop surface 47 of the cam 44 carrying the cam with it until, as the end of the record is approached, the lifting surface 49 of the cam 47 contacts the stop and lifting arm 60 of the lifting member 9. This contact blocks further rotation of the main driving wheel 2. The lifting surface 31 of the cam contacts the lifting arm 30 and moves it outwardly thereby swinging the ball joint 7 inwardly so as to reduce the pressure contact between the friction pad 19 and the sound conveying member 14 thereby allowing the spring 32 to return the stylus arm 6 to its starting position.

It should be noted that by the use of the freely mounted support of the cam disc 42 on the winding shaft 10 and the use of the detent 46 it is possible to achieve practically a two revolution wind, and unwind, of the winding stem 10 with only a single revolution of the cam disc 42.

Although the invention has been shown as embodied in a construction powered by a manually wound spring motor it is obvious to one skilled in the art that a battery powered motor alternatively might be used.

While the invention has been described and illustrated with respect to a specific embodiment thereof it will be understood that other embodiments may be resorted to without departing from the invention. Therefore, the form of the invention set out above should be considered as illustrative and not as limiting the scope of the following claims.

We claim:

1. A miniature phonograph comprising means to rotate a sound record having a laterally grooved sound track, a stylus, a stylus arm carrying the stylus to track the groove of the record, the stylus at one end of the stylus arm, supporting means at the other end of the stylus arm, the stylus arm positioned with its longitudinal axis generally in the line of the grooves of the record so that the stylus arm is vibrated transversely by the sound track, acoustical diaphragm means, and a sound conveying member bearing against the stylus arm at a position between the stylus and the supporting means in operative relationship with the diaphragm and extending generally transversely with respect to the stylus arm and solely in frictional contact therewith so that a lateral movement of the stylus arm is transferred through the frictional contact to an axial movement of the diaphragm.

2. A miniature phonograph comprising means to rotate a grooved sound record, a stylus, a stylus arm carrying the stylus to track the groove of the record, an acoustical diaphragm, a sound conveying member in operative relationship with the diaphragm, a pivoted lifter member carrying at one end said stylus arm, the other end of the lifter member bifurcated thereby forming a hold arm and a combination stop and lifting arm, the lifter arm adapted to be moved in one direction to move the stylus arm to engage the stylus in the groove of the sound record, the lifter arm adapted to be moved in the opposite direction to move the stylus arm to disengage the stylus from the groove of the record, a starting lever release arm operative to engage said hold arm of the lifter member thereby to hold the lifter arm in non-playing position, the release arm movable into playing position so that the record is rotated against the stylus to reproduce a recording thereon, a shaft, a detent member carried by the shaft, a lifter arm cam disc freely mounted on the shaft, and a double faced cam member extending from the cam disc and having a lifting surface and a detent engaging surface on one face and a stop surface on the other face, in one direction of the shaft the detent engaging surface of the cam contacted by the detent to move the cam stop surface into blocking engagement with the stop arm of the lifting member, in the other direction of the shaft the stop surface of the cam engaged by the detent to move the cam lifting surface into engagement with the lifting arm of the lifting member to raise the lifter arm into inoperative position so that the parts are in position for the start of another playback of the record.

3. A miniature phonograph comprising means to rotate a grooved sound record, a stylus, a stylus arm carrying the stylus to track the groove of the record, an acoustical diaphragm, a sound conveying member in operative relationship with the diaphragm, a pivoted lifter member carrying at one end said stylus arm, the other end of the lifter member bifurcated thereby forming a hold arm and a combination stop and lifting arm, the lifter arm adapted to be moved in one direction to move the stylus arm to engage the stylus in the groove of the sound record, the lifter arm adapted to be moved in the opposite direction to move the stylus arm to disengage the stylus from the groove of the record, a shaft, a detent member carried by the shaft, a lifter arm cam disc freely mounted on the shaft, and a double faced cam member extending from the cam disc and having a lifting surface and a detent engaging surface on one face and a stop surface on the other face, in one direction of the shaft the detent engaging surface of the cam contacted by the detent to move the cam stop surface into blocking engagement with the stop arm of the lifting member, in the other direction of the shaft the stop surface of the cam engaged by the detent to move the cam lifting surface into engagement with the lifting arm of the lifting member to raise the lifter arm into inoperative position so that the parts are in position for the start of another playback of the record.

4. A miniature phonograph comprising means to rotate a laterally grooved sound record, a stylus, a stylus arm carrying the stylus to track the groove of the record, the stylus arm of generally flat cross section, the stylus extending generally perpendicularly with respect to the width of the stylus arm, ball joint mounting means for one end of the stylus arm, sound insulation means interposed in said ball joint, spring means tending to move the stylus arm laterally, friction means carried by the stylus arm, and acoustical diaphragm including an apex, a sound conveying fulcrum member including a pair of arms, pivot means for the sound conveying member, one of the arms of the sound conveying member in fixed contact with the apex of the diaphragm, the other of the arms having a portion of reduced thickness positioned adjacent its pivoted end, and a thin swingable support for the other end of said other arm, the friction means in slideable contact with the sound conveying fulcrum member.

5. A miniature phonograph comprising means to rotate a laterally grooved sound record, a stylus, a stylus arm carrying the stylus to track the groove of the record, the stylus arm of generally flat cross section, the stylus extending generally perpendicularly with respect to the width of the stylus arm, ball joint mounting means for one end of the stylus arm, sound insulation means interposed in said ball joint, spring means tending to move the stylus arm laterally, friction means carried by the stylus arm, an acoustical diaphragm including an apex, a sound conveying fulcrum member including a pair of arms, pivot means for the sound conveying member, one of the arms of the sound conveying member in fixed contact with the apex of the diaphragm, the other of the arms having a portion of reduced thickness positioned adjacent its pivoted end, a thin swingable support for the other end of said other arm, a spring actuated pivoted lifter member carrying at one end said ball joint mounting means, the other end of the lifter member bifurcated thereby forming a hold arm and a combination stop and lifting arm, the lifter arm adapted to be moved in one direction to swing the stylus arm over the fulcrum member to engage the stylus in the groove of the sound record and thereby to provide frictional contact between the friction means and the fulcrum member, the lifter arm adapted to be moved in the opposite direction to swing the stylus arm over the culcrum member to disengage the stylus from the groove of the record and thereby to release the frictional contact between the friction means and the fulcrum member so that the said spring means tending to move the stylus arm laterally is effective to move the stylus to the starting end of the record.

6. A miniature phonograph comprising means to rotate a laterally grooved sound record having a starting end, a stylus, a stylus arm carrying the stylus to track the groove of the record, mounting means for one end of the stylus arm, spring means tending to move the stylus arm laterally, friction means carried by the stylus arm, an acoustical diaphragm, a sound conveying fulcrum member, a spring actuated pivoted lifter member carrying at one end said mounting means, the other end of the lifter member bifurcated thereby forming a hold arm and a combination stop and lifting arm, a pivoted starting lever operative between two positions and including a brake member and a release arm, the lifter arm in playing position adapted to hold the stylus arm over the fulcrum member to engage the stylus in the groove of the sound record and thereby to provide frictional contact between the friction means and the fulcrum member, the lifter arm in non-playing position adapted to hold the stylus arm to disengage the stylus from the groove of the record and thereby to release the frictional contact between the friction means and the fulcrum member so that the said spring means tending to move the stylus arm laterally is effective to move the stylus to the starting end of the record, the starting lever brake operative to prevent rotation of said rotative means and the starting lever release arm operative to engage said hold arm of the lifter member thereby to hold the lifter arm in non-playing position, in its other position the starting lever brake and the starting lever release arm ineffective so that the record is rotated against the stylus to reproduce a recording thereon, said rotatable means being a manually wound spring motor including a winding shaft, a detent member carried by the winding shaft, a main driving gear, a main spring, pawl and ratchet means operatively arranged with the winding shaft the main spring and the main driving gear for maintaining winding tension on the main spring, a lifter arm cam disc freely mounted on the winding shaft, a double faced cam member extending from the cam disc and having a lifting surface and a detent engaging surface on one face and a stop surface on the other face, in the winding direction of the winding shaft the detent engaging surface of the cam contacted by the detent to move the cam stop surface into blocking engagement with the stop arm of the lifting member thereby preventing overwind of the main spring, in the unwinding direction of the winding shaft the stop surface of the cam engaged by the detent to move the cam lifting surface into engagement with the lifting arm of the lifting member to raise the lifter arm into non-playing position ready for rewinding of the main spring and the start of another playback of the record.

7. A miniature phonograph comprising means to rotate a laterally grooved sound record having a starting end, a stylus, a stylus arm carrying the stylus to track the groove of the record, the stylus arm of generally flat cross section, the stylus extending generally perpendicularly with respect to the width of the stylus arm, ball joint mounting means for one end of the stylus arm, sound insulation means interposed in said ball joint, spring means tending to move the stylus arm laterally, a cork friction pad carried by the stylus arm, an acoustical diaphragm including an apex, a sound conveying fulcrum member including a pair of arms, pivot means for the sound conveying member, one of the arms of the sound conveying member in fixed contact with the apex of the diaphragm, the other of the arms having a portion of reduced thickness positioned adjacent its pivoted end, a thin swingable support for the other end of said other arm, a spring actuated pivoted lifter member carrying at one end said ball joint mounting means, the other end of the lifter member bifurcated thereby forming a hold arm and a combination stop and lifting arm, the lifter arm in playing position adapted to hold the stylus arm over the fulcrum member to engage the stylus in the groove of the sound record and thereby to provide frictional contact between the cork friction pad and the fulcrum member, the lifter arm in non-playing position adapted to hold the stylus arm to disengage the stylus from the groove of the record and thereby to release the frictional contact between the cork friction pad and the fulcrum member so that the said spring means tending to move the stylus arm laterally is effective to move the stylus to the starting end of the record, a starting lever release arm operative to engage said hold arm of the lifter member thereby to hold the ball joint end of the lifter arm in non-playing position, the release arm movable into an ineffective position so that the record is rotated against the stylus to reproduce a recording thereon, a shaft, a detent member carried by the shaft, a lifter arm cam disc freely mounted on the shaft, and a double faced cam member extending from the cam disc and having a lifting surface and a detent engaging surface on one face and a stop surface on the other face, in one direction of the shaft the detent engaging surface of the cam contacted by the detent to move the cam stop surface into blocking engagement with the stop arm of the lifting member, in the other direction of the shaft the stop surface of the cam engaged by the detent to move the cam lifting surface into engagement with the lifting arm of the lifting member to raise the ball joint end of the lifter arm into non-playing position ready for the start of another playback of the record.

8. A miniature phonograph comprising means to rotate a laterally grooved sound record having a starting end, a stylus, a stylus arm carrying the stylus to track the groove of the record, the stylus arm of generally flat cross section, the stylus extending generally perpendicularly with respect to the width of the stylus arm, ball joint mounting means for one end of the stylus arm, sound insulation means interposed in said ball joint, spring means tending to move the stylus arm laterally, a cork friction pad carried by the stylus arm, an acoustical diaphragm including an apex, a sound conveying fulcrum member including a pair of arms, pivot means for the sound conveying member, one of the arms of the sound conveying member in fixed contact with the apex of the diaphragm, the other of the arms having a portion of reduced thickness positioned adjacent its pivoted end, a thin swingable support for the other end of said other arm, a spring actuated pivoted lifter member carrying at one end said ball joint mounting means, the other end of the lifter member bifurcated thereby forming a hold arm and a combination stop and lifting arm, the lifter arm in playing position adapted to hold the stylus arm over the fulcrum member to engage the stylus in the groove of the sound record and thereby to provide frictional contact between the cork friction pad and the fulcrum member, the lifter arm in non-playing position adapted to hold the stylus arm to disengage the stylus from the groove of the record and thereby to release the frictional contact between the cork friction pad and the fulcrum member so that the said spring means tending to move the stylus arm laterally is effective to move the stylus to the starting end of the record, a starting lever release arm operative to engage said hold arm of the lifter member thereby to hold the ball joint end of the lifter arm in non-playing position, the release arm movable into an ineffective position so that the record is rotated against the stylus to reproduce a recording thereon, said rotatable means being a manually wound spring motor including a winding shaft, a detent member carried by the winding shaft, a main driving gear, a main spring, pawl and ratchet means operatively arranged with the winding shaft the main spring and the main driving gear for maintaining winding tension on the main spring, a lifter arm cam disc freely mounted on the winding shaft, and a double faced cam member extending from the cam disc and having a lifting surface and a detent engaging surface on one face and a stop surface on the other face, in the winding direction of the winding shaft the detent engaging surface of the cam contacted by the detent to move the cam stop surface into blocking engagement with the stop arm of the lifting member thereby preventing overwind of the main spring, in the unwinding direction of the winding shaft the stop surface of the cam engaged by the detent to move the cam lifting surface into engagement with the lifting arm of the lifting member to raise the ball joint end of the lifter arm into non-playing position ready for rewinding of the main spring and the start of another playback of the record.

9. A miniature phonograph comprising means to rotate a laterally grooved sound record having a starting end, a stylus, a stylus arm carrying the stylus to track the groove of the record, the stylus arm of generally flat cross section, the stylus extending generally perpendicularly with respect to the width of the stylus arm, ball joint mounting means for one end of the stylus arm, sound insulation means interposed in said ball joint, spring means tending to move the stylus arm laterally, a cork friction pad carried by the stylus arm, an acoustical diaphragm including an apex, a sound conveying fulcrum member including a pair of arms, pivot means for the sound conveying member, one of the arms of the sound conveying member in fixed contact with the apex of the diaphragm, the other of the arms having a portion of reduced thickness positioned adjacent its pivoted end, a thin swingable support for the other end of said other arm, a spring actuated pivoted lifter member carrying at one end said ball joint mounting means, the other end of the lifter member bifurcated thereby forming a hold arm and a combination stop and lifting arm, a pivoted starting lever operative between two positions and including a brake member and a release arm, the lifter arm in playing position adapted to hold the stylus arm over the fulcrum member to engage the stylus in the groove of the sound record and thereby to provide frictional contact between the cork friction pad and the fulcrum member, the lifter arm in non-playing position adapted to hold the stylus arm to disengage the stylus from the groove of the record and thereby to release the frictional contact between the cork friction pad and the fulcrum member so that the said spring means tending to move the stylus arm laterally is effective to move the stylus to the starting end of the record, the starting lever brake operative to prevent rotation of said rotative means and the starting lever release arm operative to engage said hold arm of the lifter member thereby to hold the ball joint end of the lifter arm in non-playing position, in its other position the starting lever brake and the starting lever ineffective so that the record is rotated against the stylus to reproduce a recording thereon, a shaft, a detent member carried by the shaft, a lifter arm cam disc freely mounted on the shaft, and a double faced cam member extending from the cam disc and having a lifting surface and a detent engaging surface on one face and a stop surface on the other face, in one direction of the shaft the detent engaging surface of the cam contacted by the detent to move the cam stop surface into blocking engagement with the stop arm of the lifting member, in the other direction of the shaft the stop surface of the cam engaged by the detent to move the cam lifting surface into engagement with the lifting arm of the lifting member to raise the ball joint end of the lifter arm into non-playing position ready for the start of another playback of the record.

10. A miniature phonograph comprising means to rotate a laterally grooved sound record having a starting end, a stylus, a stylus arm carrying the stylus to track the groove of the record, the stylus arm of generally flat cross section, the stylus extending generally perpendicularly with respect to the width of the stylus arm, ball joint mounting means for one end of the stylus arm, sound insulation means interposed in said ball joint, spring means tending to move the stylus arm laterally, a cork friction pad carried by the stylus arm, an acoustical diaphragm including an apex, a sound conveying fulcrum member inluding a pair of arms, pivot means for the sound conveying member, one of the arms of the sound conveying member in fixed contact with the apex of the diaphragm, the other of the arms having a portion of reduced thickness positioned adjacent its pivoted end, a thin swingable support for the other end of said other arm, a spring actuated pivoted lifter member carrying at one end said ball joint mounting means, the other end of the lifter member bifurcated thereby forming a hold arm and a combination stop and lifting arm, a pivoted starting lever operative between two positions and including a brake member and a release arm, the lifter arm in playing position adapted to hold the stylus arm over the fulcrum member to engage the stylus in the groove of the sound record and thereby to provide frictional contact between the cork friction pad and the fulcrum member, the lifter arm in non-playing position adapted to hold the stylus arm to disengage the stylus from the groove of the record and thereby to release the frictional contact between the cork friction pad and the fulcrum member so that the said spring means tending to move the stylus arm laterally is effective to move the stylus to the starting end of the record, the starting lever brake operative to prevent rotation of said rotative means and the starting lever release arm operative to engage said hold arm of the lifter member thereby to hold the ball joint end of the lifter arm in non-playing position, in its other position the starting lever brake and the starting lever release arm ineffective so that the record is rotated against the stylus to reproduce a recording thereon, said rotatable means being a manually wound spring motor including a winding shaft, a detent member carried by the winding shaft, a main driving gear, a main spring, pawl and ratchet means operatively arranged with the winding shaft the main spring and the main driving gear for maintaining winding tension on the main spring, a lifter arm cam disc freely mounted on the winding shaft, and a double faced cam member extending from the cam disc and having a lifting surface and a detent engaging surface on one face and a stop surface on the other face, in the winding direction of the winding shaft the detent engaging surface of the cam contacted by the detent to move the cam stop surface into blocking engagement with the stop arm of the lifting member thereby preventing overwind of the main spring, in the unwinding direction of the winding shaft the stop surface of the cam engaged by the detent to move the cam lifting surface into engagement with the lifting arm of the lifting member to raise the ball joint end of the lifter arm into non-playing position ready for rewinding of the main spring and the start of another playback of the record.

References Cited by the Examiner

UNITED STATES PATENTS

| | | | |
|---|---|---|---|
| 1,047,976 | 12/12 | Noll | 274—17 X |
| 1,473,004 | 11/23 | Bishop. | |
| 1,984,637 | 12/34 | Foley et al. | 274—25 |
| 2,043,687 | 6/36 | Wilhelm | 274—17 |
| 2,689,736 | 9/54 | Siegel | 274—1 X |
| 2,961,242 | 11/60 | Zimmermann et al. | 274—14 |
| 3,082,006 | 3/63 | Ryan | 274—26 |

LOUIS J. CAPOZI, *Primary Examiner.*

ALDRICH F. MEDBERY, *Examiner.*